(12) United States Patent
Loh et al.

(10) Patent No.: US 11,620,516 B2
(45) Date of Patent: Apr. 4, 2023

(54) SPECIALIZING NEURAL NETWORKS FOR HETEROGENEOUS SYSTEMS

(71) Applicant: Arm Limited, Cambridge (GB)

(72) Inventors: Danny Daysang Loh, Menlo Park, CA (US); Lingchuan Meng, Santa Clara, CA (US); Naveen Suda, San Jose, CA (US); Eric Kunze, Santa Clara, CA (US); Ahmet Fatih Inci, Pittsburgh, PA (US)

(73) Assignee: Arm Limited, Cambridge (GB)

( * ) Notice: Subject to any disclaimer, the term of this patent is extended or adjusted under 35 U.S.C. 154(b) by 622 days.

(21) Appl. No.: 16/724,849

(22) Filed: Dec. 23, 2019

(65) Prior Publication Data

US 2021/0192337 A1    Jun. 24, 2021

(51) Int. Cl.
| | |
|---|---|
| *G06N 3/08* | (2006.01) |
| *G06N 20/10* | (2019.01) |
| *G06N 3/063* | (2023.01) |
| *G06N 3/04* | (2023.01) |
| *G06N 20/00* | (2019.01) |
| *G06N 20/20* | (2019.01) |

(52) U.S. Cl.
CPC ............ *G06N 3/08* (2013.01); *G06N 3/0454* (2013.01); *G06N 3/063* (2013.01)

(58) Field of Classification Search
USPC ........... 706/6, 15, 41, 45, 43, 33, 31, 25, 16
See application file for complete search history.

(56) References Cited

U.S. PATENT DOCUMENTS

| 10,923,111 | B1 * | 2/2021 | Fan ......................... G10L 15/16 |
|---|---|---|---|
| 2018/0034695 | A1 * | 2/2018 | Balasubramanian .... G06N 3/04 |
| 2018/0300633 | A1 * | 10/2018 | McBride ............... G06F 9/4881 |
| 2018/0365558 | A1 * | 12/2018 | Sekiyama ................ G06N 3/04 |
| 2019/0180176 | A1 * | 6/2019 | Yudanov .................. G06N 3/08 |
| 2020/0005135 | A1 * | 1/2020 | Che ......................... G06N 3/063 |
| 2020/0012924 | A1 * | 1/2020 | Ma ......................... G06N 5/046 |

* cited by examiner

*Primary Examiner* — Daquan Zhao
(74) *Attorney, Agent, or Firm* — Leveque Intellectual Property Law, P.C.

(57) ABSTRACT

The present disclosure advantageously provides a heterogenous system, and a method for generating an artificial neural network (ANN) for a heterogenous system. The heterogenous system includes a plurality of processing units coupled to a memory configured to store an input volume. The plurality of processing units includes first and second processing units. The first processing unit includes a first processor and is configured to execute a first ANN, and the second processing unit includes a second processor and is configured to execute a second ANN. The first and second ANNs respectively include an input layer, at least one processor-optimized hidden layer and an output layer. The second ANN hidden layers are different than the first ANN hidden layers.

16 Claims, 9 Drawing Sheets

SPECIALIZING NEURAL NETWORKS FOR HETEROGENEOUS SYSTEMS

BACKGROUND

The present disclosure relates to computer systems. More particularly, the present disclosure relates to computer systems that include neural networks.

With the recent advancements in hardware platforms and increasing data deluge, artificial neural networks (ANNs), and, more particularly, deep neural networks (DNN), have achieved remarkable success in various tasks such as, for example, object detection, image recognition, speech recognition, etc. As a consequence, machine learning (ML) applications have migrated to mobile platforms for the use of a wider audience. From a hardware perspective, mobile platforms have become more heterogenous in terms of hardware components, such as processors, microprocessors, coprocessors, specialized processors, etc. Although mobile platforms employ this heterogeneity to improve energy-efficiency, most of these hardware components are underutilized.

DETAILED DESCRIPTION

Figure 1:
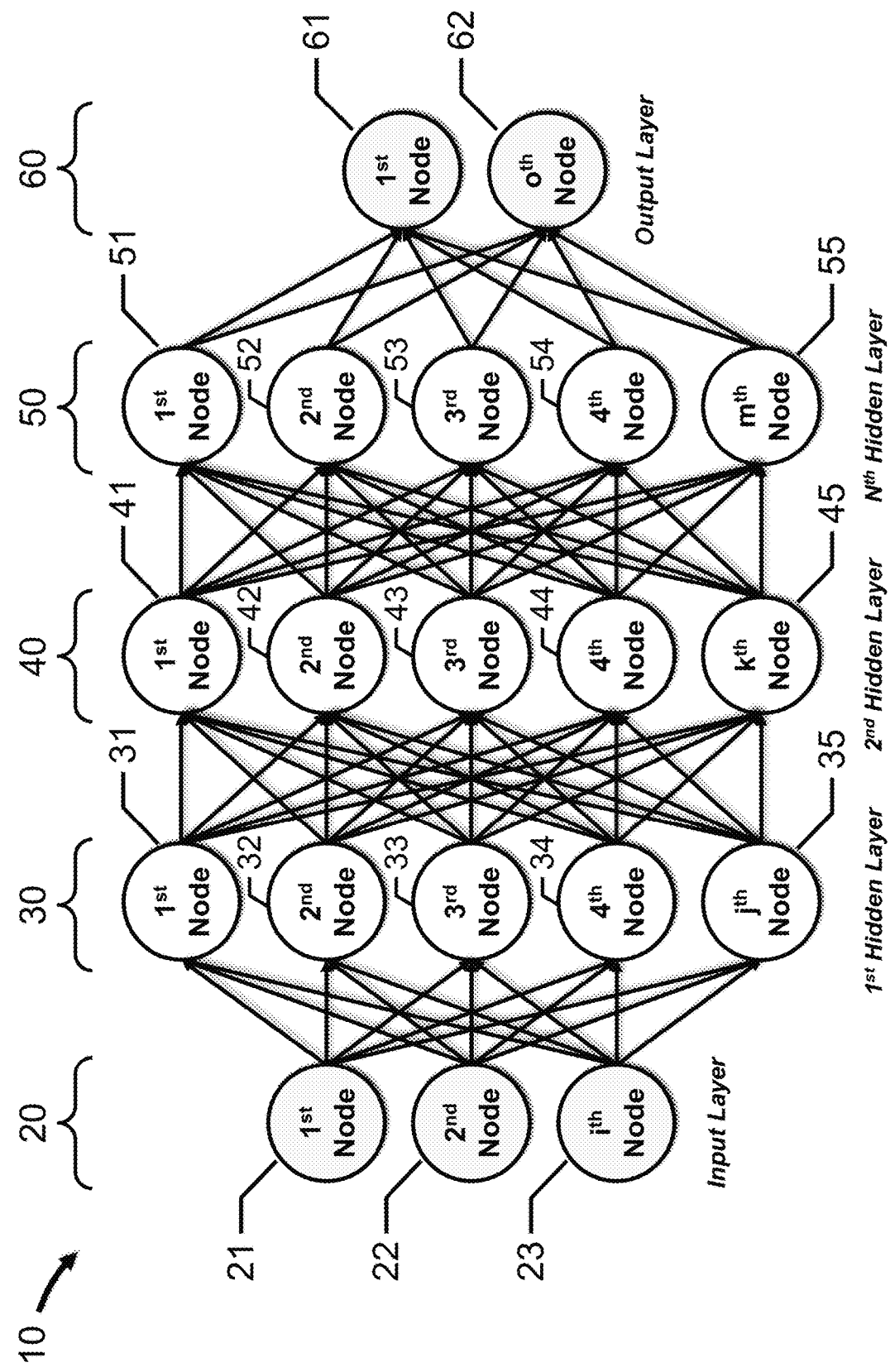
FIG. 1 depicts an artificial neural network (ANN), in accordance with an embodiment of the present disclosure.

Embodiments of the present disclosure will now be described with reference to the drawing figures, in which like reference numerals refer to like parts throughout.

One way to accelerate deep learning workloads running on systems with multiple hardware components is to partition the ANN model, based on data parallelism or model parallelism, and then run the partitioned ANN model on the multiple hardware components. As described herein, hardware components that run ANN models are generally known as hardware accelerators (HAs), and include, for example, processors, including processing units (CPUs), coprocessors and specialized processors, such as graphics processing units (GPUs), neural processing units (NPUs), etc., customized programmable circuits, such as field programmable gate arrays (FPGAs), application specific integrated circuits (ASICs), etc., digital signal processors (DSPs), etc.

An ANN model that has been partitioned based on data parallelism runs the same ANN model on each hardware component and partitions the input data into data partitions or minibatches that are supplied to each hardware component. The results from each ANN model are then concatenated to form the final result.

An ANN model that has been partitioned based on model parallelism divides the ANN model into a sequence of ANN model partitions and runs one ANN model partition on each hardware component. For example, each ANN model partition may include a number of ANN model layers. Input data is provided to the first ANN model partition in the sequence, and the intermediate results from the first ANN model partition are provided as input to the second ANN model partition, and so on. Generally, while the ANN model partitions may be running in parallel on different hardware components, the data flow for any given input data is serial in nature.

However, partitioning an ANN workload to fully utilize all of the available hardware components in a heterogeneous system is a difficult compiler/runtime problem. It is also demanding for the same ANN model to run optimally on all the hardware components due to different characteristics of each hardware component, such as, for example, a CPU, a GPU and a NPU.

Embodiments of the present disclosure advantageously leverage underutilized hardware components to perform more computations at similar latencies or perform the same number of computations in a shorter amount of time. More particularly, embodiments of the present disclosure run specialized ANNs that leverage the different performance characteristics of the different hardware components in a heterogeneous system, such as, for example, CPUs, GPUs, NPUs, DSPs, FPGAs, ASICs, etc. In certain embodiments, an ensemble of specialized DNN model results at the end of the processing flow advantageously increases the final accuracy.

In one embodiment, a heterogenous system includes a memory configured to store an input volume, and a plurality processing units, coupled to the memory, including a first processing unit that includes a first processor, and a second processing unit that includes a second processor that is different than the first processor.

The first processing unit is configured to execute a first ANN that includes an input layer configured to receive at least a first portion of the input volume, one or more first ANN hidden layers optimized for the first processor, and an output layer.

The second processing unit is configured to execute a second ANN that includes an input layer configured to receive at least a second portion of the input volume, one or more second ANN hidden layers optimized for the second processor, and an output layer. The second ANN hidden layers are different than the first ANN hidden layers.

In a further embodiment, the plurality of processing units includes a third processing unit that includes a third processor that is different than the first processor and the second processor. The third processing unit is configured to execute a third ANN that includes an input layer to receive at least a third portion of the input volume, one or more third ANN hidden layers optimized for the third processor, and an output layer. The third ANN hidden layers are different than the first ANN hidden layers and the second ANN hidden layers.

An ANN models the relationships between input data or signals and output data or signals using a network of interconnected nodes that is trained through a learning process. The nodes are arranged into various layers, including, for example, an input layer, one or more hidden layers, and an output layer. The input layer receives input data, such as, for example, image data, and the output layer generates output data, such as, for example, a probability that the image data contains a known object. Each hidden layer provides at least a partial transformation of the input data to the output data. A DNN has multiple hidden layers in order to model complex, nonlinear relationships between input data and output data.

In a fully-connected, feedforward ANN, each node is connected to all of the nodes in the preceding layer, as well as to all of the nodes in the subsequent layer. For example, each input layer node is connected to each hidden layer node, each hidden layer node is connected to each input layer node and each output layer node, and each output layer node is connected to each hidden layer node. Additional hidden layers are similarly interconnected. Each connection has a weight value, and each node has an activation function, such as, for example, a linear function, a step function, a sigmoid function, a tan h function, a rectified linear unit (ReLu) function, etc., that determines the output of the node based on the weighted sum of the inputs to the node. The input data propagates from the input layer nodes, through respective connection weights to the hidden layer nodes, and then through respective connection weights to the output layer nodes.

More particularly, at each input node, input data is provided to the activation function for that node, and the output of the activation function is then provided as an input data value to each hidden layer node. At each hidden layer node, the input data value received from each input layer node is multiplied by a respective connection weight, and the resulting products are summed or accumulated into an activation signal value that is provided to the activation function for that node. The output of the activation function is then provided as an input data value to each output layer node. At each output layer node, the output data value received from each hidden layer node is multiplied by a respective connection weight, and the resulting products are summed or accumulated into an activation signal value that is provided to the activation function for that node. The output of the activation function is then provided as output data. Additional hidden layers may be similarly configured to process data.

FIG. 1 depicts an ANN, in accordance with an embodiment of the present disclosure.

ANN 10 includes input layer 20, one or more hidden layers 30, 40, 50, etc., and output layer 60. Input layer 20 includes one or more input nodes 21, 22, 23, etc. Hidden layer 30 includes one or more hidden nodes 31, 32, 33, 34, 35, etc. Hidden layer 40 includes one or more hidden nodes 41, 42, 43, 44, 45, etc. Hidden layer 50 includes one or more hidden nodes 51, 52, 53, 54, 55, etc. Output layer 60 includes one or more output nodes 61, 62, etc. Generally, ANN 10 includes N hidden layers, input layer 20 includes "i" nodes, hidden layer 30 includes "j" nodes, hidden layer 40 includes "k" nodes, hidden layer 50 includes "m" nodes, and output layer 60 includes "o" nodes.

In one embodiment, N equals 1, i equals 3, j equals 5 and o equals 2 (not depicted in FIG. 1). Input node 21 is coupled to hidden nodes 31 to 35, input node 22 is coupled to hidden nodes 31 to 35, and input node 23 is coupled to hidden nodes 31 to 35. Hidden node 31 is coupled to output nodes 61 and 62, hidden node 32 is coupled to output nodes 61 and 62, hidden node 33 is coupled to output nodes 61 and 62, hidden node 34 is coupled to output nodes 61 and 62, and hidden node 35 is coupled to output nodes 61 and 62.

In another embodiment, N equals 3, i equals 3, j, k and m equal 5 and o equals 2 (depicted in FIG. 1). Input node 21 is coupled to hidden nodes 31 to 35, input node 22 is coupled to hidden nodes 31 to 35, and input node 23 is coupled to hidden nodes 31 to 35. Hidden node 31 is coupled to hidden nodes 41 to 45, hidden node 32 is coupled to hidden nodes 41 to 45, hidden node 33 is coupled to hidden nodes 41 to 45, hidden node 34 is coupled to hidden nodes 41 to 45, and hidden node 35 is coupled to hidden nodes 41 to 45. Hidden node 41 is coupled to hidden nodes 51 to 55, hidden node 42 is coupled to hidden nodes 51 to 55, hidden node 43 is coupled to hidden nodes 51 to 55, hidden node 44 is coupled to hidden nodes 51 to 55, and hidden node 45 is coupled to hidden nodes 51 to 55. Hidden node 51 is coupled to output nodes 61 and 62, hidden node 52 is coupled to output nodes 61 and 62, hidden node 53 is coupled to output nodes 61 and 62, hidden node 54 is coupled to output nodes 61 and 62, and hidden node 55 is coupled to output nodes 61 and 62.

Many other variations of input, hidden and output layers are clearly possible, including hidden layers that are locally-connected, rather than fully-connected, to one another.

Training an ANN includes optimizing the connection weights between nodes by minimizing the prediction error of the output data until the ANN achieves a particular level of accuracy. One method is backpropagation, or backward propagation of errors, which iteratively and recursively determines a gradient descent with respect to the connection weights, and then adjusts the connection weights to improve the performance of the network.

A multi-layer perceptron (MLP) is a fully-connected ANN that has an input layer, an output layer and one or more hidden layers. MLPs may be used for natural language processing applications, such as machine translation, speech recognition, etc. Other ANNs include recursive neural networks (RNNs), long short-term memories (LSTMs), sequence-to-sequence models that include an encoder RNN and a decoder RNN, shallow neural networks, etc.

A CNN is a variation of an MLP that may be used for classification or recognition applications, such as image recognition, speech recognition, etc. A CNN has an input layer, an output layer and multiple hidden layers including convolutional layers, pooling layers, normalization layers, fully-connected layers, etc. Each convolutional layer applies a sliding dot product or cross-correlation to an input volume, applies an activation function to the results, and then provides the activation or output volume to the next layer. Convolutional layers typically use the ReLu function as the activation function. In certain embodiments, the activation function is provided in a separate activation layer, such as, for example, a ReLu layer. A pooling layer reduces the dimensions of the output volume received from the preceding convolutional layer, and may calculate an average or a maximum over small clusters of data, such as, for example, 2×2 matrices. In certain embodiments, a convolutional layer and a pooling layer may form a single layer of a CNN. The fully-connected layers follow the convolutional and pooling layers, and include a flatten layer and a classification layer, followed by a normalization layer that includes a normalization function, such as the SoftMax function. The output layer follows the last fully-connected layer; in certain embodiments, the output layer may include the normalization function.

Figure 2:
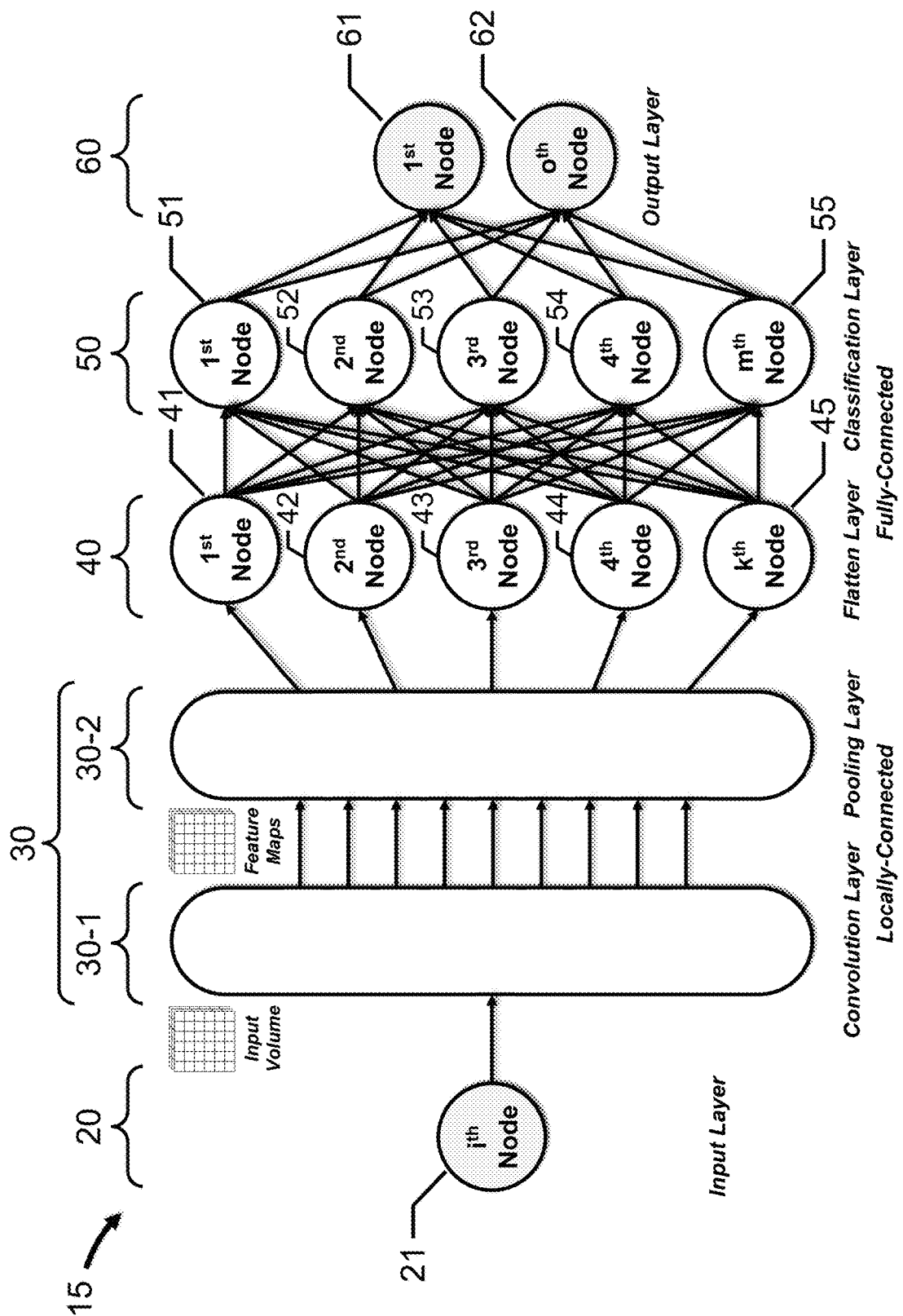
FIG. 2 depicts a convolutional neural network (CNN), in accordance with an embodiment of the present disclosure.

FIG. 2 depicts a CNN, in accordance with an embodiment of the present disclosure. CNN 15 includes input layer 20, one or more hidden layers, such as convolutional layer 30-1, pooling layer 30-2, flatten layer 40, classification layer 50, etc., and output layer 60. Many other variations of input, hidden and output layers are contemplated.

Input layer 20 includes one or more input nodes 21, etc., that present the input data, such as a color image, as an input volume to the first convolutional layer, e.g., convolutional layer 30-1. The input volume is a three-dimensional matrix that has a width, a height and a depth. For example, input data that represent a color image are presented as an input volume that is 512 pixels×512 pixels×3 channels (red, green, blue); other input volume dimensions may also be used, such as 32×32×3, 64×64×3, 128×128×3, etc., 32×32×1, 64×64×1, 128×128×1, 512×512×1, etc.

Convolutional layer 30-1 is locally-connected to input layer 20, and includes a plurality of nodes that are connected to local regions in the input volume (not depicted for clarity). For a CNN that uses a standard convolution, each node computes a dot product between the node's weights and the respective local region of the input volume. An activation function is then applied to the results of each convolution calculation to produce an output volume that is provided as an input volume to the subsequent layer. The activation function may be applied by each convolutional layer node or by the nodes of a subsequent locally-connected ReLu layer.

Pooling layer 30-2 is locally-connected to convolutional layer 30-1, and includes a plurality of nodes that are connected to local regions in the input volume (not depicted for clarity). Pooling layer 30-2 also produces an output volume that is provided as the input volume to the subsequent layer, such as, for example, another convolutional layer 30-1, a flatten layer 40, etc. In certain embodiments, convolutional layer 30-1 and pooling layer 30-2 form a single hidden layer 30. Similarly, in certain embodiments, convolutional layer 30-1, a ReLu layer and pooling layer 30-2 form a single hidden layer 30. Generally, the output volumes of the convolutional and pooling layers may be described as feature maps, and one or more single hidden layers 30 form a feature learning portion of CNN 15.

Hidden layer 40 is a "flatten" layer that is locally-connected to pooling layer 30-2, and includes one or more nodes 41, 42, 43, 44, 45, etc. Hidden (flatten) layer 40 "flattens" the output volume produced by the preceding pooling layer 30-2 into a column vector, which is provided to the subsequent, fully-connected hidden layer 50.

Hidden layer 50 is a classification layer that is fully-connected to hidden (flatten) layer 40, and includes one or more nodes 51, 52, 53, 54, 55, etc.

Output layer 60 includes one or more output nodes 61, 62, etc., and is fully-connected to hidden (classification) layer 50. Fully-connected output layer 60 receives the classification results output by hidden (classification) layer 50, and each node outputs a predicted class score. A normalization function, such as a Softmax function, may be applied to the predicted class scores by output layer 60, or, alternatively, by an additional layer interposed between hidden (classification) layer 50 and output layer 60.

Similar to ANNs, training a CNN includes optimizing the connection weights between nodes by minimizing the prediction error of the output data until the CNN achieves a particular level of accuracy. As noted above, backpropagation may be used to iteratively and recursively determines a gradient descent with respect to the connection weights, and then adjusts the connection weights to improve the performance of the network.

Figure 3:
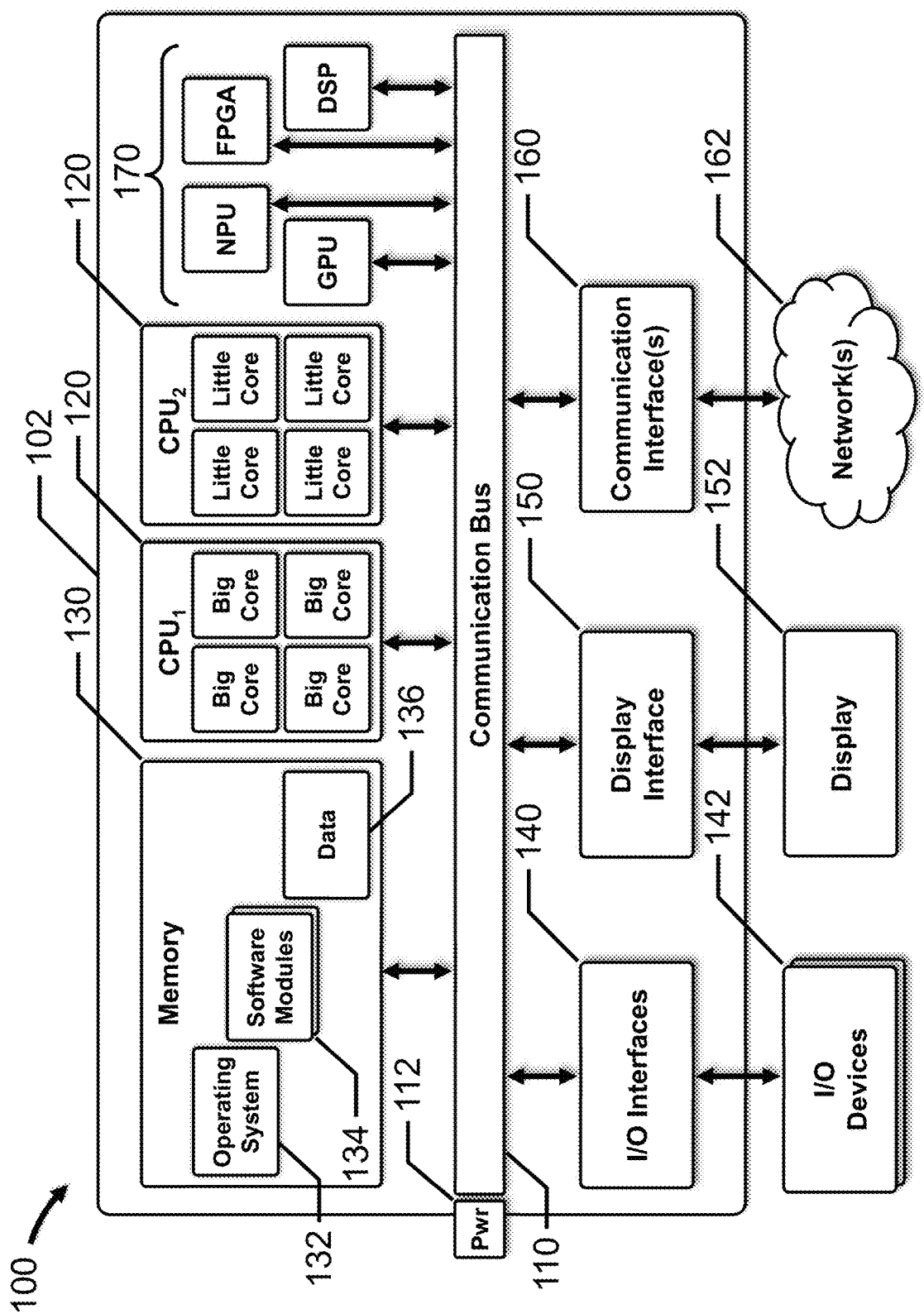
FIG. 3 depicts a block diagram of a system, in accordance with an embodiment of the present disclosure.

FIG. 3 depicts a block diagram of system, in accordance with an embodiment of the present disclosure.

System 100 includes communication bus 110 coupled to one or more processors 120, memory 130, I/O interfaces 140, display interface 150, one or more communication interfaces 160 and one or more HAs 170. Generally, I/O interfaces 140 are coupled to I/O devices 142 using a wired or wireless connection, display interface 150 is coupled to display 152, and communication interface 160 is connected to network 162 using a wired or wireless connection. In many embodiments, certain components of system 100 are implemented as a system-on-chip (SoC) 102; in other embodiments, system 100 may be hosted on a traditional printed circuit board, motherboard, etc.

Communication bus 110 is a communication system that transfers data between processor 120, memory 130, I/O interfaces 140, display interface 150, communication interface 160, HAs 170, as well as other components not depicted in FIG. 1. Power connector 112 is coupled to communication bus 110 and a power supply (not shown). In certain embodiments, communication bus 110 is a network-on-chip (NoC).

Processor 120 includes one or more general-purpose or application-specific microprocessors that executes instructions to perform control, computation, input/output, etc. functions for system 100. Processor 120 may include a single integrated circuit, such as a micro-processing device, or multiple integrated circuit devices and/or circuit boards working in cooperation to accomplish the functions of processor 120. Generally, system 100 may include one or more central processing units (CPUs) 120, each containing one or more processing cores.

For example, system 100 may include 2 CPUs, i.e., $CPU_1$ 120 and $CPU_2$ 120, each containing multiple processing cores, as depicted in FIG. 3. In certain embodiments, $CPU_1$ 120 and $CPU_2$ 120 form a heterogeneous processing architecture, such as, for example, Arm's "big.LITTLE" architecture, that couples relatively battery-saving and slower processor cores ("LITTLE" cores), i.e., $CPU_2$ 120, with relatively more powerful and power-hungry processing cores ("big" cores), i.e., $CPU_1$ 120. For example, $CPU_1$ 120 may be a high performance processor containing 4 "big" processing cores, e.g., Arm Cortex-A73, Cortex-A75, Cortex-A76, etc., while $CPU_2$ 120 may be a high efficiency processor containing 4 "little" processing cores, e.g., Arm Cortex-53, Arm Cortex-55, etc.

In many embodiments, processor 120 may also be configured to execute classification-based machine learning models, such as, for example, ANNs, DNNs, CNNs, RNNs, SVM, Naïve Bayes etc. In these embodiments, processor 120 may provide the same functionality as a hardware accelerator, such as HA 170.

In addition, processor 120 may execute computer programs or modules, such as operating system 132, software modules 134, etc., stored within memory 130. For example, software modules 134 may include an ML application, an ANN application, a DNN application, a CNN application, an RNN application, etc.

Generally, storage element or memory 130 stores instructions for execution by processor 120 and data. Memory 130 may include a variety of non-transitory computer-readable medium that may be accessed by processor 120. In various embodiments, memory 130 may include volatile and non-volatile medium, non-removable medium and/or removable medium. For example, memory 130 may include any combination of random access memory (RAM), dynamic RAM (DRAM), static RAM (SRAM), read only memory (ROM), flash memory, cache memory, and/or any other type of non-transitory computer-readable medium.

Memory 130 contains various components for retrieving, presenting, modifying, and storing data. For example, memory 130 stores software modules that provide functionality when executed by processor 120. The software modules include operating system 132 that provides operating system functionality for system 100. Software modules 134 provide various functionality, such as image classification using convolutional neural networks, etc. Data 136 may include data associated with operating system 132, software modules 134, etc.

I/O interfaces 140 are configured to transmit and/or receive data from I/O devices 142. I/O interfaces 140 enable connectivity between processor 120 and I/O devices 142 by encoding data to be sent from processor 120 to I/O devices 142, and decoding data received from I/O devices 142 for processor 120. Generally, data may be sent over wired and/or wireless connections. For example, I/O interfaces 140 may include one or more wired communications interfaces, such as USB, Ethernet, etc., and/or one or more wireless communications interfaces, coupled to one or more antennas, such as WiFi, Bluetooth, cellular, etc.

Generally, I/O devices 142 provide input to system 100 and/or output from system 100. As discussed above, I/O devices 142 are operably connected to system 100 using a wired and/or wireless connection. I/O devices 142 may include a local processor coupled to a communication interface that is configured to communicate with system 100 using the wired and/or wireless connection. For example, I/O devices 142 may include a keyboard, mouse, touch pad, joystick, etc.

Display interface 150 is configured to transmit image data from system 100 to monitor or display 152.

Communication interface 160 is configured to transmit data to and from network 162 using one or more wired and/or wireless connections. Network 162 may include one or more local area networks, wide area networks, the Internet, etc., which may execute various network protocols, such as, for example, wired and/or wireless Ethernet, Bluetooth, etc. Network 162 may also include various combinations of wired and/or wireless physical layers, such as, for example, copper wire or coaxial cable networks, fiber optic networks, Bluetooth wireless networks, WiFi wireless networks, CDMA, FDMA and TDMA cellular wireless networks, etc.

HAs 170 are configured to execute classification-based machine learning models, such as, for example, ANNs, CNNs, RNNs, SVM, Naïve Bayes etc., in support of software modules 134. Generally, HAs 170 may include one or more CPUs, GPUs, NPUs, such as, for example, the ARM Machine Learning Processor or a custom-designed processing engine executing the underlying ML inference algorithm, etc. As noted above, processor 120 may provide the same functionality as HAs 170. Additionally, HAs 170 may include one or more DSPs, FPGAs, ASICs, etc., and may include one or more memory blocks including RAM, ROM, EEPROM, flash memory, etc., integrated circuits, programmable circuits, etc.

As noted above, partitioning a DNN workload to fully utilize all of the available hardware components in a heterogeneous system is a difficult compiler/runtime problem. It is also demanding for the same DNN model to run optimally on all the hardware components due to different characteristics of each hardware component, such as, for example, a CPU, GPU and NPU.

Embodiments of the present disclosure advantageously use underutilized hardware components to perform more computations at similar latencies or perform the same number of computations in a shorter amount of time. More particularly, embodiments of the present disclosure run specialized DNNs that leverage the different performance characteristics of the different hardware components in a heterogeneous system, such as, for example, a CPU, GPU, NPU, DSP, FPGA, ASIC, etc.

Figure 4:
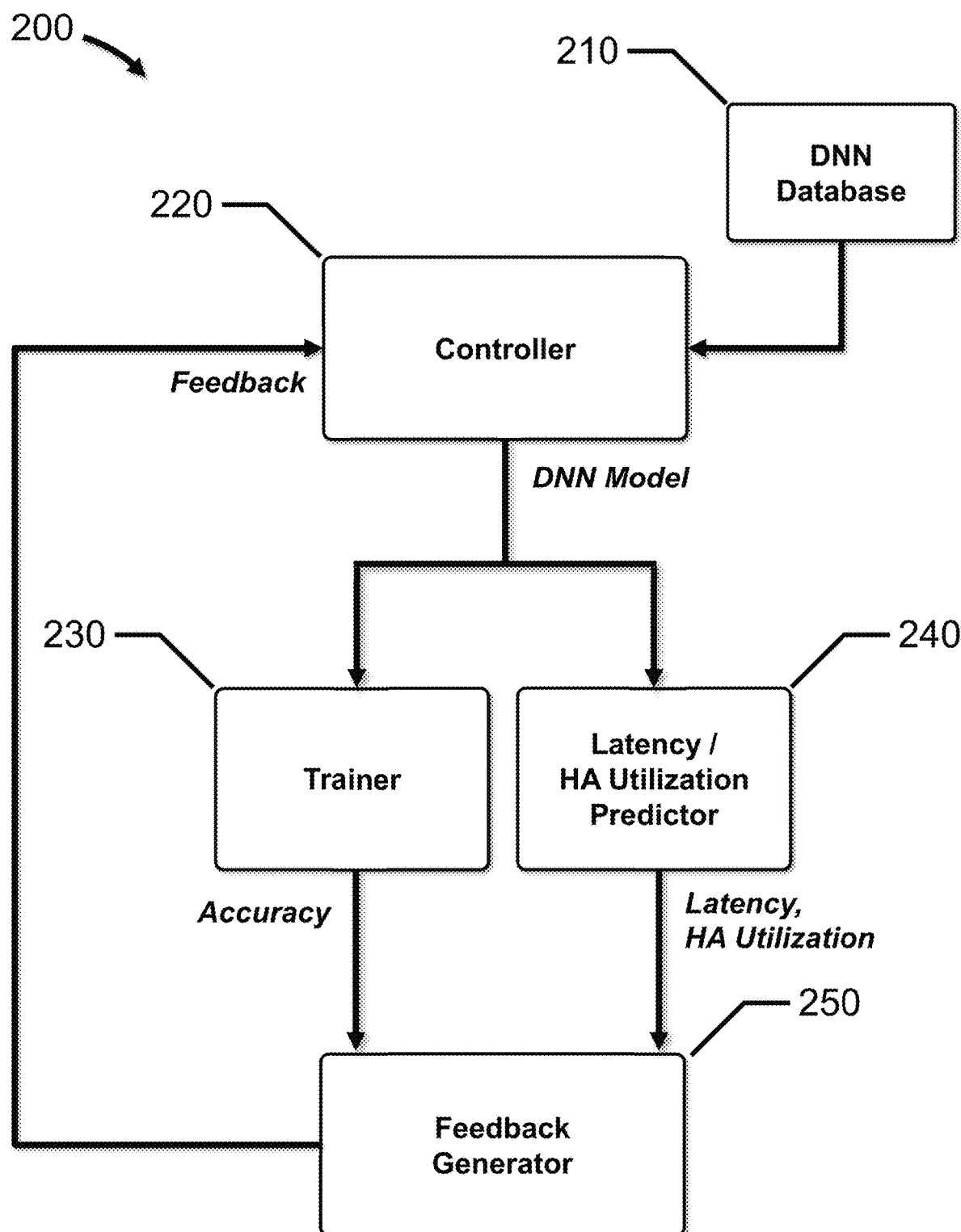
FIG. 4 depicts a reinforcement learning (RL) based neural architecture search for heterogeneous system (NASH) model, in accordance with an embodiment of the present disclosure.

FIG. 4 depicts a reinforcement learning (RL)-based neural architecture search for heterogeneous system (NASH) model, in accordance with an embodiment of the present disclosure.

Generally, RL-based NASH model 200 is executed on a computer system, and includes one or more neural network model databases and a plurality of software modules. In one embodiment, RL-based NASH model 200 includes DNN database 210, controller module 220, trainer module 230, latency/HA utilization predictor module 240 and feedback generator module 250. In this embodiment, RL-based NASH model 200 generates an optimal DNN model; other types of optimal neural networks and machine learning models are also contemplated by the present disclosure.

Generating an optimal DNN model is non-trivial, and requires navigating through the latency and accuracy characteristics of different DNN elements targeting different heterogeneous components. The DNN elements may include, for example, complete models, portions of models, blocks, layers, kernels, etc. In certain embodiments, reinforcement learning is used to search through the DNN elements to maximize the accuracy within provided latency constraints. DNN database 210 stores these DNN elements within a search space. Other embodiments may employ different learning techniques, such as, for example, Bayesian optimization, evolutionary search, gradient-based optimization, random search, etc.

In certain embodiments, controller module 220 retrieves a set of DNN elements from DNN database 210 to construct a complete DNN model, and then provides the DNN model to trainer module 230, latency/HA utilization predictor module 240 and feedback generator module 250.

Trainer module 230 trains the DNN model to predict its accuracy, which is provided to feedback generator module 250. In certain embodiments, trainer module 230 fully trains the DNN model, while in other embodiments, trainer module 230 partially trains the DNN model. Other heuristic training techniques are also contemplated by the present disclosure.

Latency/HA utilization predictor module 240 determines the overall latency and HA utilization for that particular DNN model running on one or more particular HAs 170, such as a CPU, GPU, NPU, etc., and provides this information to feedback generator module 250. For example, a CPU may demonstrate a lower latency and a higher hardware utilization using a CNN model with small kernels (e.g., 3×3 and smaller), while a GPU or NPU may demonstrate a lower latency and a higher hardware utilization using a CNN model with large kernels (e.g., 5×5 and larger). Generally, a DNN model for a GPU or an NPU will include more large kernels (and fewer small kernels) than a DNN model for a CPU, due to the greater processing power of the GPU and NPU as compared to a CPU. Similarly, a DNN model for an NPU will generally include more large kernels (and fewer small kernels) than a DNN model for a CPU or a GPU, due to the specialized processing power of an NPU as compared to the CPU or GPU. In certain embodiments, latency/HA utilization predictor module 240 includes a hardware architectural simulator for each particular HA 170 that runs the DNN model.

Feedback generator module 250 provides feedback to controller module 220 regarding the performance of the selected DNN model on each particular HA. In certain embodiments, the feedback is a metric, such as a reward, that is a function of one or more objectives, such as, for example, DNN model size, accuracy, latency, and HA utilization. Additional objectives may include, for example, power efficiency, etc.

Controller module 220 then adjusts the DNN model elements, or selects a new DNN model, based on the feedback received from the feedback generator module 250. In certain embodiments, controller module 220 adjusts the DNN model elements, or selects a new DNN model, to maximize the reward. The new or adjusted DNN model is provided to trainer module 230, latency/HA utilization predictor module 240 and feedback generator module 250 for another iteration. In certain embodiments, the DNN model is optimized when the feedback is within a pre-determined value.

Figure 5:
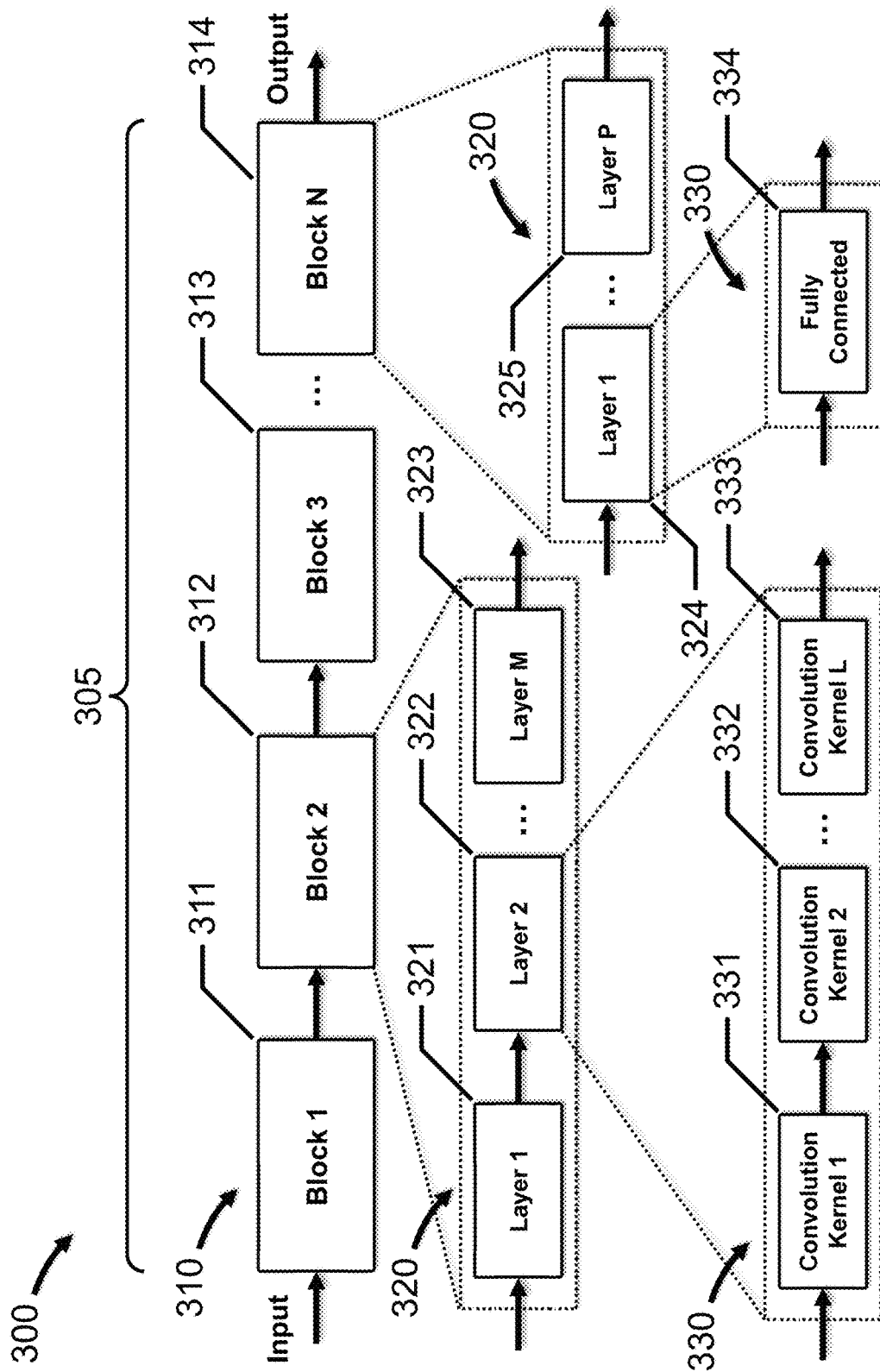
FIG. 5 depicts a search space for an RL-based NASH model, in accordance with an embodiment of the present disclosure.

FIG. 5 depicts search space 300 for RL-based NASH model 200, in accordance with an embodiment of the present disclosure.

As discussed above, search space 300 provides various DNN elements, including complete models, portions of models, blocks, layers, kernels, etc. For example, a complete model 305 includes a particular sequence of blocks 310, such as, for example, block 311, block 312, block 313, block 314, etc. Each of the blocks 310 may include one or more layers 320. For example, block 312 may include one or more layers 321, 322, 323, etc., while block 314 may include one or more layers 324, 325, etc. Each of the layers 320 may include one or more functional modules 330. For example, layer 322 may include one or more functional modules 331, 332, 333, etc., while layer 324 may include one or more functional modules 334. For a CNN model, layers 320 include an input layer, convolutional layers, pooling layers, fully connected layers, an output layer, etc., as discussed above. In certain embodiments, layers 320 may be provided in a single block 310, while in other embodiments, layers 320 may be divided among two or more blocks 310. For example, functional modules 331, 332, 333 and 334 may be convolutional layer kernels, such as a 1×1 kernel, a 3×3 kernel, a 5×5 kernel, a 7×7 kernel, etc., while functional module 334 may be a normalization function, such as the SoftMax function.

As discussed above, embodiments of the present disclosure leverage the different performance characteristics of the different hardware components in a heterogeneous system, such as, for example, CPUs, GPUs, NPUs, DSPs, FPGAs, ASICs, etc. In certain embodiments, RL-based NASH model 200 partitions the DNN model based on a coarse partitioning technique, while in other embodiments, RL-based NASH model 200 partitions the DNN model based on a fine partitioning technique. The partitioning technique used by RL-based NASH model 200 is selectable by the user, and may be based on such considerations as system hardware architecture, system performance requirements, etc.

Figure 6:
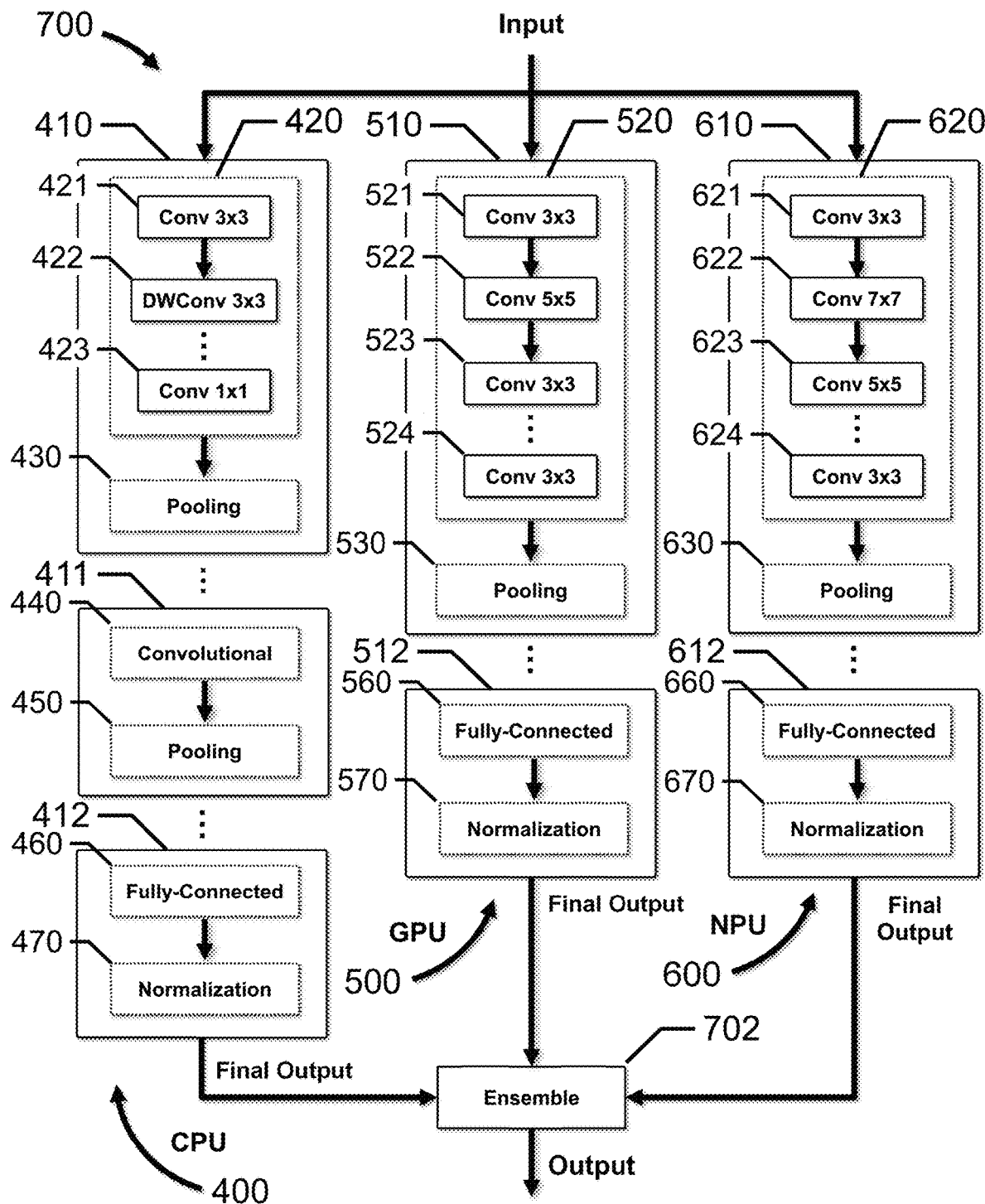
FIG. 6 depicts a coarsely-partitioned CNN model, in accordance with an embodiment of the present disclosure.

FIG. 6 depicts a coarsely-partitioned CNN model 700, in accordance with an embodiment of the present disclosure. Coarsely partitioning other types of DNN models is also contemplated by the present disclosure.

Using the coarse partitioning technique, RL-based NASH model 200 creates a separate, complete, HA-specific DNN model for each hardware component in the heterogeneous system, such as, for example, a CPU model, a GPU model, an NPU model, a DSP model, an FPGA model, an ASIC model, etc. The entire input volume is provided to each HA-specific DNN model, and the output of each HA-specific DNN model is combined or "ensembled" to create the final output. For the coarse partitioning technique, RL-based NASH model 200 may be executed separately for each of the HA-specific models to be created.

An ensembling technique may be used to combine the output of each of the HA-specific DNN models to create the final output. In one embodiment, an average ensembling technique is used to average the output of each of the HA-specific DNN models to create the final output. In another embodiment, a weighted-average ensembling technique is used to weight the output of the HA-specific DNN models. For example, the weighted-average may be based on the HA's floating point operations per second (FLOPS) or log(FLOPS), which may account for the different accuracies of the separate, complete, HA-specific DNN models.

The coarse partitioning technique advantageously eliminates data communication overhead between the different HAs because only the final output from each HA-specific DNN model is ensembled. Additionally, the coarse partitioning technique allows the system to release a hardware component, such as, for example, a GPU, when the resource is needed to run an intermittent workload, such as, for example, a GPU workload.

In one embodiment, CNN model 700 includes CPU model 400, GPU model 500, NPU model 600 and ensemble block 702. In other embodiments, additional HA models may be created, depending on the hardware components of the system, such as, for example, a DSP model, etc.

For example, in certain embodiments, CPU model 400 may be run on $CPU_1$ 120 that contains 4 "big" processing cores, e.g., Arm Cortex-A73, Cortex-A75, Cortex-A76, etc. In this embodiment, a separate CPU model 400 may be run each processing core, or, alternatively, a single CPU model 400 may be parallelized by the CPU compiler and run on all 4 processing cores. Similarly, a separate GPU model 500 may be run on each GPU processing core, or, alternatively, a single GPU model 500 may be parallelized by the GPU compiler and run on all the available processing cores. And, a separate NPU model 600 may be run on each NPU processing core, or, alternatively, a single NPU model 600 may be parallelized by the NPU compiler and run on all the available processing cores.

CPU model 400 includes blocks 410, 411 and 412. Additional blocks may also be included as needed, which are suggested by the vertical ellipses in FIG. 6.

Block 410 includes layers 420 and 430. Additional layers may also be included, as needed. Generally, layer 420 is the first convolutional layer, which may be preceded by a separate input layer. The entire input volume is provided to block 410. Layer 420 includes one or more convolution functions or kernels, such as kernel 421, kernel 422, kernel 423, etc. Additional kernels may also be included as needed, which are suggested by the vertical ellipses in FIG. 6. For example, kernel 421 may be a 3×3 convolution, kernel 422 may be a 3×3 depth-wise convolution, kernel 423 may be a 1×1 convolution, and so on. Layer 430 may be a pooling layer, which typically follows a convolutional layer. In certain embodiments, convolutional and pooling functions may be combined into a single layer. The output of block 410 is provided as the input to block 411.

Block 411 includes layers 440 and 450. Additional layers may also be included, as needed. Layer 440 is convolutional layer, while layer 450 is a pooling layer. Layer 440 includes one or more convolution functions or kernels, as described with respect to layer 420. The output of block 411 is provided as the input to block 412.

Block 412 includes one or more layers 460, 470, etc. Layer 460 is a fully-connected layer. In many embodiments, at least two layers 460 may be included in the final block, e.g., a flatten layer followed by a classification layer. Layer 470 is a normalization layer, and includes a normalization function, such as the SoftMax function. An output layer may follow layer 470, or, alternatively, layer 470 may be the output layer. The output of block 412 is provided as an input to ensemble block 702.

GPU model 500 includes blocks 510 and 512. Additional blocks may also be included as needed, which are suggested by the vertical ellipses in FIG. 6.

Block 510 includes layers 520 and 530. Additional layers may also be included, as needed. Generally, layer 520 is the first convolutional layer, which may be preceded by a separate input layer. The entire input volume is provided to block 510. Layer 520 includes one or more convolution functions or kernels, such as kernel 521, kernel 522, kernel 523, kernel 524, etc. Additional kernels may also be included as needed, which are suggested by the vertical ellipses in FIG. 6. For example, kernel 521 may be a 3×3 convolution, kernel 522 may be a 5×5 convolution, kernel 423 may be a 3×3 convolution, kernel 524 may be a 3×3 convolution, and so on. Layer 530 may be a pooling layer, which typically follows a convolutional layer. In certain embodiments, convolutional and pooling functions may be combined into a single convolutional layer. The output of block 510 is provided as the input to block 512.

Block 512 includes one or more layers 560, 570, etc. Layer 560 is a fully-connected layer. In many embodiments, at least two layers 560 may be included in the final block, e.g., a flatten layer followed by a classification layer. Layer 570 is a normalization layer, and includes a normalization function, such as the SoftMax function. An output layer may follow layer 570, or, alternatively, layer 570 may be the output layer. The output of block 512 is provided as an input to ensemble block 702.

NPU model 600 includes blocks 610 and 612. Additional blocks may also be included as needed, which are suggested by the vertical ellipses in FIG. 6.

Block 610 includes layers 620 and 630. Additional layers may also be included, as needed. Generally, layer 620 is the first convolutional layer, which may be preceded by a separate input layer. The entire input volume is provided to block 610. Layer 620 includes one or more convolution functions or kernels, such as kernel 621, kernel 622, kernel 623, kernel 624, etc. Additional kernels may also be included as needed, which are suggested by the vertical ellipses in FIG. 6. For example, kernel 621 may be a 3×3 convolution, kernel 622 may be a 7×7 convolution, kernel 623 may be a 5×5 convolution, kernel 624 may be a 3×3 convolution, and so on. Layer 630 may be a pooling layer, which typically follows a convolutional layer. In certain embodiments, convolutional and pooling functions may be combined into a single convolutional layer. The output of block 610 is provided as the input to block 612.

Block 612 includes one or more layers 660, 670, etc. Layer 660 is a fully-connected layer. In many embodiments, at least two layers 660 may be included in the final block, e.g., a flatten layer followed by a classification layer. Layer 670 is a normalization layer, and includes a normalization function, such as the SoftMax function. An output layer may follow layer 670, or, alternatively, layer 670 may be the output layer. The output of block 612 is provided as an input to ensemble block 702.

Ensemble block 702 uses an ensembling technique to combine the output of each of the HA-specific DNN models, i.e., CPU model 400, GPU model 500 and NPU model 600, to create the final output for CNN model 700, such as, an average, a weighted-average, etc.

Figure 7A:
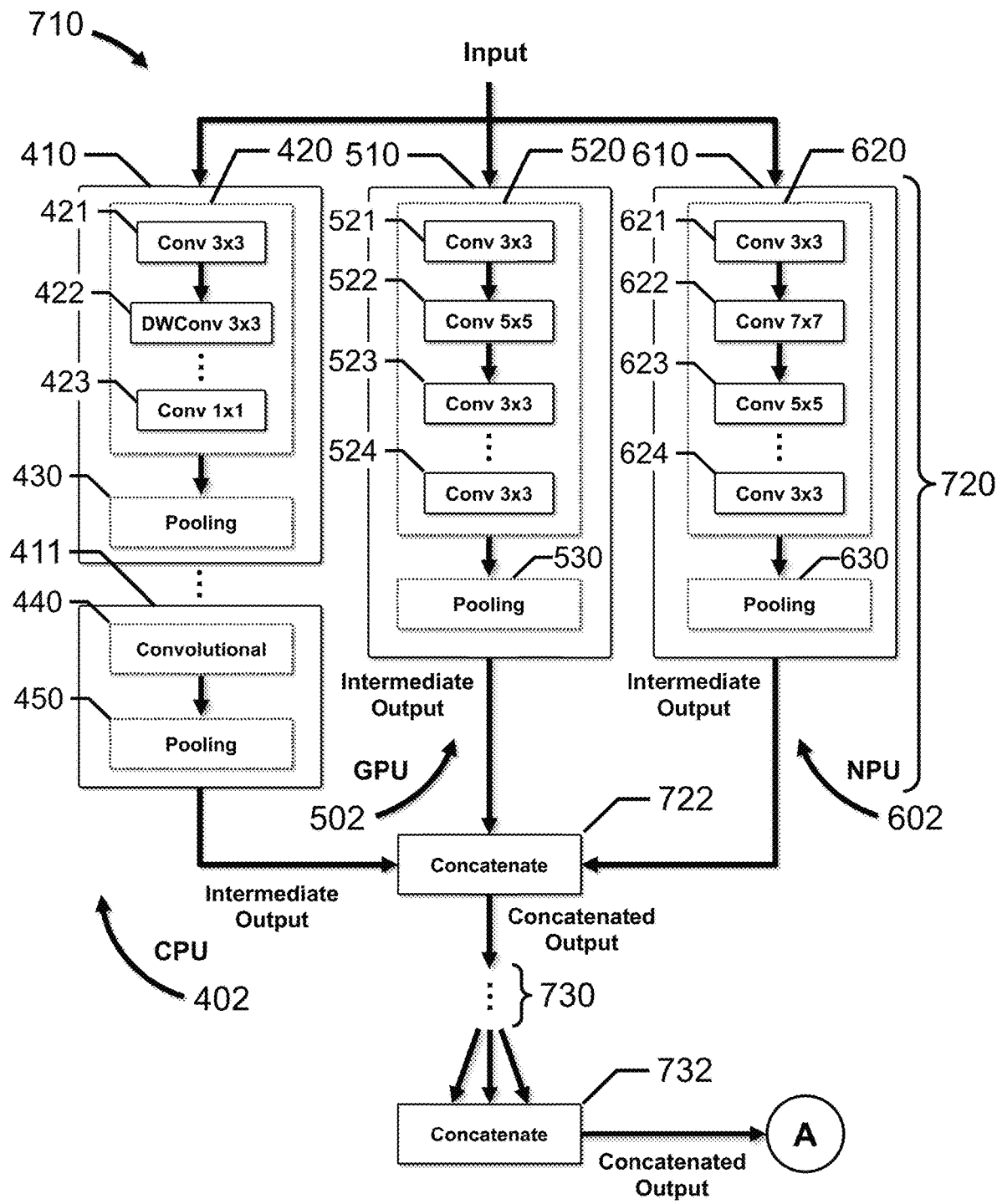
FIGS. 7A and 7B depict a finely-partitioned CNN model, in accordance with an embodiment of the present disclosure.
Figure 7B:
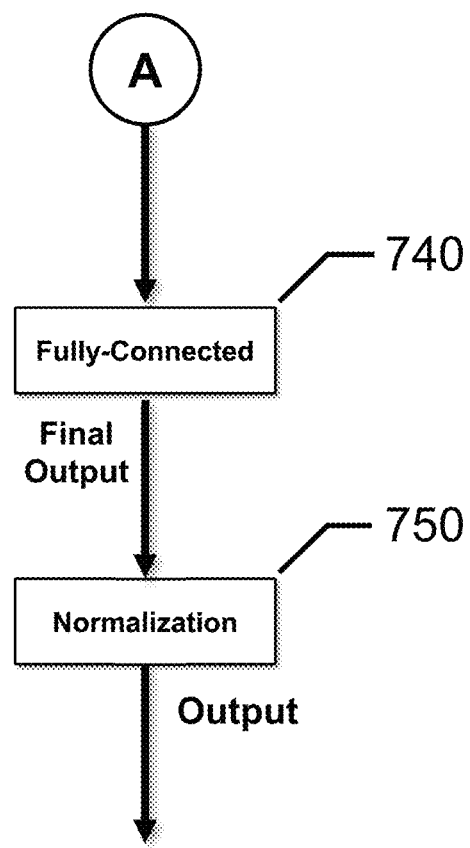

FIGS. 7A and 7B depict a finely-partitioned CNN model 710, in accordance with an embodiment of the present disclosure. Finely partitioning other types of DNN models is also contemplated by the present disclosure.

Using the fine partitioning technique, RL-based NASH model 200 creates a DNN model that utilizes all the hardware components by splitting the DNN model into parallel HA-specific DNN models and partitioning each HA-specific DNN models into sections based on optimal network depth. In certain embodiments, during execution, the entire input volume is partitioned into input sub-volumes, and a different input sub-volume is provided to the first section of each HA-specific DNN model. The intermediate outputs of the first section of each HA-specific DNN model are concatenated to form a new input volume, which is partitioned into a new input sub-volume. The new input sub-volumes are then provided to the next HA-specific DNN model sections. This process is repeated for each DNN model section. In other embodiments, during execution, the various input volumes are not partitioned; instead, entire input volumes are provided in parallel to each HA-specific DNN model. The final outputs from the final HA-specific DNN model sections are then concatenated and provided to a fully-connected block, and the output volume from the fully-connected block is provided to a normalization block to generate the output. In one embodiment, the optimal network depth depends on the communication overhead between the different hardware components.

The fine partitioning technique may advantageously achieve higher accuracy than the coarse partitioning technique because the information from the different branches of the neural network are combined (concatenated).

In one embodiment, CNN model 710 includes CPU model 402, GPU model 502, NPU model 602, concatenate block 722, fully-connected block 740, and normalization block 750. CPU model 402, GPU model 502, and NPU model 602 are partitioned into section 720, and one or more optional sections 730 (indicated by the vertical ellipses for clarity). Each optional section 730 provides additional functionality and is followed by concatenate block 732. In other embodiments, additional HA models may be created, depending on the hardware components of the system, such as, for example, a DSP model, etc.

For example, in certain embodiments, CPU model 402 may be run on $CPU_1$ 120 that contains 4 "big" processing cores, e.g., Arm Cortex-A73, Cortex-A75, Cortex-A76, etc. In this embodiment, a separate CPU model 402 may be run each processing core, or, alternatively, a single CPU model 402 may be parallelized by the compiler and run on all 4 processing cores. Similarly, a separate GPU model 502 may be run on each GPU processing core, or, alternatively, a single GPU model 502 may be parallelized by the compiler and run on all the available processing cores. And, a separate NPU model 602 may be run on each NPU processing core, or, alternatively, a single NPU model 602 may be parallelized by the compiler and run on all the available processing cores.

Section 720 of CPU model 402 includes blocks 410 and 411, while section 740 of CPU model 402 includes block 412. Additional blocks may also be included as needed, which are suggested by the vertical ellipses in FIG. 7.

Block 410 includes layers 420 and 430. Additional layers may also be included, as needed. Generally, layer 420 is the first convolutional layer, which may be preceded by a separate input layer. A portion or sub-volume of the input volume is provided to block 410. Layer 420 includes one or more convolution functions or kernels, such as kernel 421, kernel 422, kernel 423, etc. Additional kernels may also be included as needed, which are suggested by the vertical ellipses in FIG. 7. For example, kernel 421 may be a 3×3 convolution, kernel 422 may be a 3×3 depth-wise convolution, kernel 423 may be a 1×1 convolution, and so on. Layer 430 may be a pooling layer, which typically follows a convolutional layer. In certain embodiments, convolutional and pooling functions may be combined into a single layer. The output of block 410 is provided as the input to block 411.

Block 411 includes layers 440 and 450. Additional layers may also be included, as needed. Layer 440 is convolutional layer, while layer 450 is a pooling layer. Layer 440 includes one or more convolution functions or kernels, as described with respect to layer 420. The intermediate output of block 411 is provided to concatenate block 722.

Block 412 includes one or more layers 460, etc. Layer 460 is a fully-connected layer. In many embodiments, at least two layers 460 may be included in the final block, e.g., a flatten layer followed by a classification layer. The final output of block 412 is provided to concatenate block 742.

Section 720 of GPU model 502 includes block 510, while section 740 of GPU model 502 includes block 512. Additional blocks may also be included as needed.

Block 510 includes layers 520 and 530. Additional layers may also be included, as needed. Generally, layer 520 is the first convolutional layer, which may be preceded by a separate input layer. A portion or sub-volume of the input volume is provided to block 510. Layer 520 includes one or more convolution functions or kernels, such as kernel 521, kernel 522, kernel 523, kernel 524, etc. Additional kernels may also be included as needed, which are suggested by the vertical ellipses in FIG. 7. For example, kernel 521 may be a 3×3 convolution, kernel 522 may be a 5×5 convolution, kernel 423 may be a 3×3 convolution, kernel 524 may be a 3×3 convolution, and so on. Layer 530 may be a pooling layer, which typically follows a convolutional layer. In certain embodiments, convolutional and pooling functions may be combined into a single convolutional layer. The intermediate output of block 510 is provided to concatenate block 722.

Block 512 includes one or more layers 560, etc. Layer 560 is a fully-connected layer. In many embodiments, at least two layers 560 may be included in the final block, e.g., a flatten layer followed by a classification layer. The final output of block 512 is provided to concatenate block 742.

Section 720 of NPU model 600 includes block 610, while section 740 of NPU model 600 includes block 612. Additional blocks may also be included as needed.

Block 610 includes layers 620 and 630. Additional layers may also be included, as needed. Generally, layer 620 is the first convolutional layer, which may be preceded by a separate input layer. A portion or sub-volume of the input volume is provided to block 610. Layer 620 includes one or more convolution functions or kernels, such as kernel 621, kernel 622, kernel 623, kernel 624, etc. Additional kernels may also be included as needed, which are suggested by the vertical ellipses in FIG. 7. For example, kernel 621 may be a 3×3 convolution, kernel 622 may be a 7×7 convolution, kernel 623 may be a 5×5 convolution, kernel 624 may be a 3×3 convolution, and so on. Layer 630 may be a pooling layer, which typically follows a convolutional layer. In certain embodiments, convolutional and pooling functions may be combined into a single convolutional layer. The intermediate output of block 610 is provided to concatenate block 722.

Block 612 includes one or more layers 660, etc. Layer 660 is a fully-connected layer. In many embodiments, at least two layers 660 may be included in the final block, e.g., a flatten layer followed by a classification layer. The final output of block 612 is provided to concatenate block 742.

Concatenate block 722 concatenates the intermediate output of each respective HA-specific DNN model block, i.e., blocks 411, 510, 610, to create a new input volume. When an optional section 730 follows section 720, then concatenate block 722 partitions the new input volume into new input sub-volumes, and provides a different, new input sub-volume to the next respective HA-specific DNN partitioned model block in section 730. Alternatively, concatenate block 722 may provide the entire new input volume to each HA-specific DNN partitioned model block in section 730, as discussed above. When optional section 730 does not follow section 720, concatenate block 722 provides the new input volume to fully-connected block 740.

Fully-connected block 740 includes one or more fully-connected layers that process the new input volume, and then provide an output volume to normalization block 750.

Normalization block 750 includes a normalization function, such as the SoftMax function, and provides the output for CNN model 710.

Advantageously, any neural network application that needs fast response will benefit from specialized neural networks targeting heterogeneous systems, such as, for example, a SoC, etc. For example, a face-unlock application for a mobile device may include a data flow that has a face detection stage followed by a facial feature extraction, recognition and verification stage. Face detection is generally fast, and the face detection stage may be run on an energy-efficient processor to save overall battery charge. Once a face is detected, however, the facial features may be extracted, recognized and verified using a face extraction, recognition and verification stage that includes an ANN, such as a CNN, etc. Advantageously, the ANN may be designed to utilize all the resources (e.g., CPU, GPU, NPU, etc.) in a heterogenous SoC in order to improve the response time (i.e. user experience) without impacting the accuracy.

Figure 8:
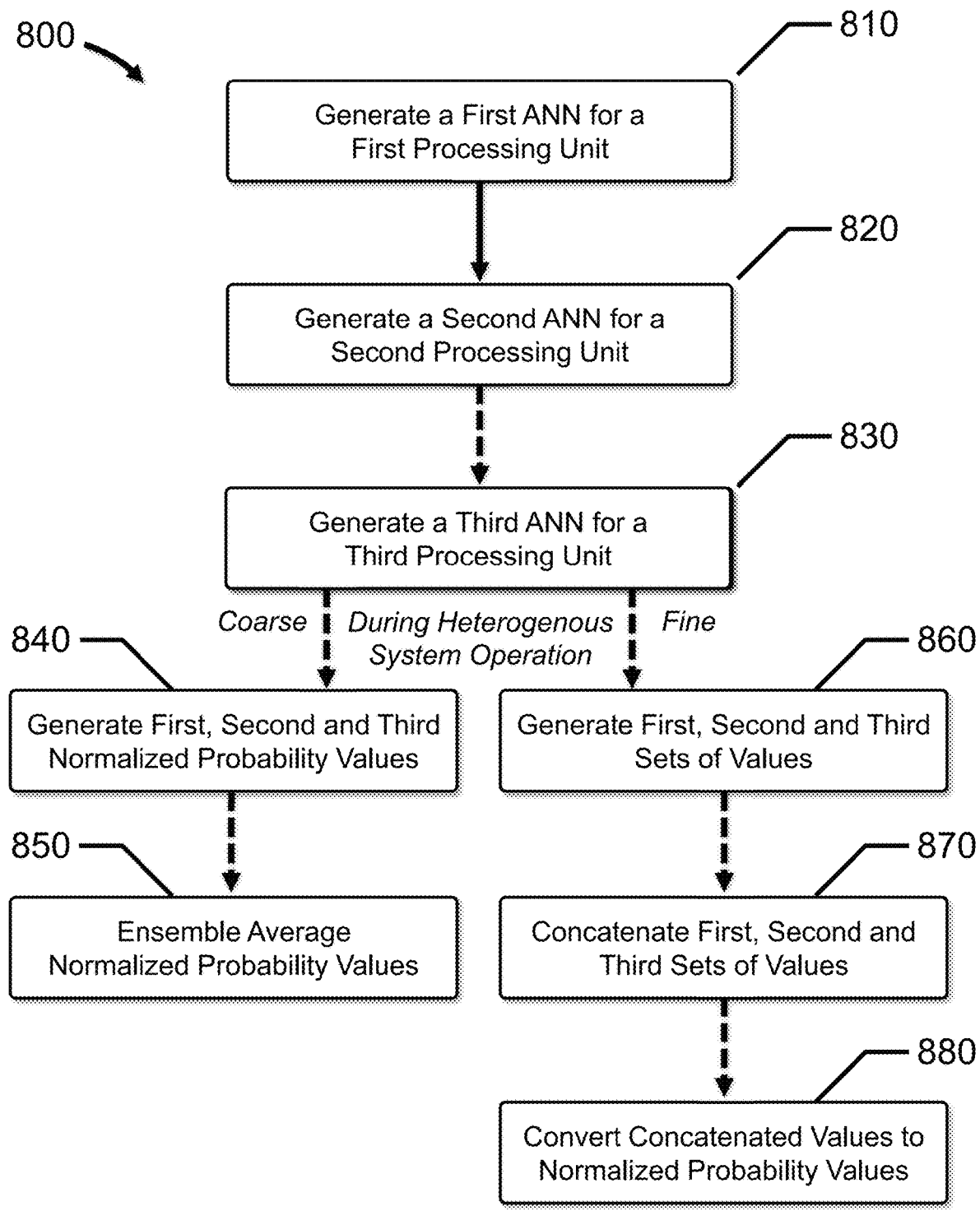
FIG. 8 depicts a flow diagram presenting functionality for generating an ANN for a heterogenous system, in accordance with embodiments of the present disclosure.

FIG. 8 depicts a flow diagram 800 presenting functionality for generating an ANN for a heterogenous system, in accordance with embodiments of the present disclosure.

In one embodiment, at 810, a first ANN for a first processing unit is generated. The first processing unit has at least one first processor. The first ANN includes an input layer configured to receive at least a first portion of an input volume, one or more first ANN hidden layers optimized for the first processor, and an output layer. The first ANN is generated is based on an accuracy of the first ANN, a latency of the first processing unit and a utilization of the first processing unit.

At 820, a second ANN for a second processing unit is generated. The second processing unit has at least one second processor that is different than the first processor. The second ANN includes an input layer configured to receive at least a second portion of an input volume, one or more second ANN hidden layers optimized for the second processor, and an output layer. The second ANN hidden layers are different than the first ANN hidden layers. The second ANN is generated is based on an accuracy of the second ANN, a latency of the second processing unit and a utilization of the second processing unit.

In a further embodiment, at 830, a third ANN for a third processing unit is generated. The third processing unit has at least one third processor that is different than the first processor and the second processor. The third ANN includes an input layer configured to receive at least a third portion of an input volume, one or more third ANN hidden layers optimized for the third processor, and an output layer. The third ANN hidden layers are different than the first ANN hidden layers and the second ANN hidden layers. The third ANN is generated is based on an accuracy of the third ANN, a latency of the third processing unit and a utilization of the third processing unit.

During operation of heterogenous system 100, additional functionality at 840 and 850 (e.g., coarsely-partitioned ANNs), or, alternatively at 860, 870 and 880 (e.g., finely-partitioned ANNs), may be provided to extend the functionality for generating an ANN for a heterogenous system.

At 840, a first set of normalized probability values is generated by the first ANN output layer, a second set of normalized probability values is generated by the second ANN output layer, and a third set of normalized probability values is generated by the third ANN output layer.

At 850, the first, second and third sets of normalized probability values are ensemble averaged, using respective first, second and third weights, into a final set of normalized probability values.

At 860, a first set of values is generated by the first ANN output layer, a second set of values is generated by the second ANN output layer, and a third set of values is generated by the third ANN output layer.

At 870, the first, second and third sets of values are concatenated into a set of probability values.

At 880, the set of probability values are converted into a set of normalized probability values.

Embodiments of the present disclosure advantageously leverage underutilized hardware components to perform more computations at similar latencies or perform the same number of computations in a shorter amount of time. More particularly, embodiments of the present disclosure run specialized ANNs that leverage the different performance characteristics of the different hardware components in a heterogeneous system, such as, for example, CPUs, GPUs, NPUs, DSPs, FPGAs, ASICs, etc. In certain embodiments, an ensemble of specialized DNN model results at the end of the processing flow advantageously increases the final accuracy. The embodiments described above and summarized below are combinable.

In one embodiment, a heterogenous system includes a memory and a plurality of processing units coupled to the memory. The memory is configured to store an input volume having an input width, an input height, an input depth and a plurality of input values, the input depth being determined by a number of input channels. The plurality of processing units includes a first processing unit and a second processing unit. The first processing unit includes at least one first processor, and is configured to execute a first artificial neural network (ANN) including an input layer configured to receive at least a first portion of the input volume, one or more first ANN hidden layers optimized for the first processor, and an output layer. The second processing unit includes at least one second processor that is different than the first processor, and is configured to execute a second ANN including an input layer configured to receive at least a second portion of the input volume, one or more second ANN hidden layers optimized for the second processor, and an output layer, the second ANN hidden layers being different than the first ANN hidden layers.

In another embodiment, the plurality of processing units includes a third processing unit, having at least one third processor that is different than the first processor and the second processor, configured to execute a third ANN including an input layer to receive at least a third portion of the input volume, one or more third ANN hidden layers optimized for the third processor, and an output layer, the third ANN hidden layers being different than the first ANN hidden layers and the second ANN hidden layers.

In another embodiment, the first processing unit is a central processing unit (CPU), the second processing unit is a graphics processing unit (GPU), and the third processing unit is a neural processing unit (NPU).

In another embodiment, the first ANN is a first convolutional neural network (CNN) that includes convolutional layers having small and large kernels, activation layers, pooling layers, and fully-connected layers; the second ANN is a second CNN that includes convolutional layers having small and large kernels, activation layers, pooling layers, and fully connected layers, the second CNN convolutional layers having fewer small kernels and more large kernels than the first CNN; and the third ANN is a third CNN that includes convolutional layers having small and large kernels, activation layers, pooling layers, and fully connected layers, the third CNN convolutional layers having fewer small kernels and more large kernels than the first CNN or the second CNN.

In another embodiment, the small kernel is convolution filter having a size of 3×3 or smaller; and the large kernel is convolution filter having a size of 5×5 or larger.

In another embodiment, the first ANN output layer generates a first set of normalized probability values, the second ANN output layer generates a second set of normalized probability values, and the third ANN output layer generates a third set of normalized probability values; and the first processing unit is configured to ensemble average the first, second and third sets of normalized probability values, using respective first, second and third weights, into a final set of normalized probability values.

In another embodiment, the first, second and third weights are 1.

In another embodiment, the first weight is based on a number of floating point operations per second (FLOPS) for the first processor, the second weight is based on a number of FLOPS for the second processor, and the third weight is based on a number of FLOPS for the third processor.

In another embodiment, the first ANN output layer generates a first set of values, the second ANN output layer generates a second set of values, and the third ANN output layer generates a third set of values; and the first processing unit is configured to concatenate the first, second and third sets of values into a set of probability values, and convert the set of probability values into a set of normalized probability values.

In another embodiment, the first ANN hidden layers include a first block and a second block, the first block includes one or more hidden layers, the second block includes one or more hidden layers, and the first block is configured to output a first intermediate volume; the second ANN hidden layers include a first block and a second block, the first block includes one or more hidden layers, the second block includes one or more hidden layers, and the first block is configured to output a second intermediate volume; the third ANN hidden layers include a first block and a second block, the first block includes one or more hidden layers, the second block includes one or more hidden layers, and the first block is configured to output a third intermediate volume; and the first processing unit is configured to concatenate the first, second and third intermediate volumes into a single intermediate volume, and provide at least a first portion of the single intermediate volume to the second block of the first ANN, a second portion of the single intermediate volume to the second block of the second ANN, and a third portion of the single intermediate volume to the second block of the third ANN.

In another embodiment, the first processing unit is configured to execute a facial recognition application, the input volume is an image of a face, and the first, second and third ANNs extract facial features from the image.

In a further embodiment, a method for generating an artificial neural network (ANN) for a heterogenous system includes generating a first ANN for a first processing unit having at least one first processor, the first ANN including an input layer configured to receive at least a first portion of an input volume, one or more first ANN hidden layers optimized for the first processor, and an output layer, where generating the first ANN is based on an accuracy of the first ANN, a latency of the first processing unit and a utilization of the first processing unit; and generating a second ANN for a second processing unit having at least one second processor that is different than the first processor, the second ANN including an input layer configured to receive at least a second portion of the input volume, one or more second ANN hidden layers optimized for the second processor, and an output layer, the second ANN hidden layers being different than the first ANN hidden layers, where generating the second ANN is based on an accuracy of the second ANN, a latency of the second processing unit and a utilization of the second processing unit.

In another embodiment, the method further includes generating a third ANN for a third processing unit having at least one third processor that is different than the first processor and the second processor, the third ANN including an input layer to receive at least a third portion of the input volume, one or more third ANN hidden layers optimized for the third processor, and an output layer, the third ANN hidden layers being different than the first ANN hidden layers and the second ANN hidden layers, where generating the third ANN is based on an accuracy of the third ANN, a latency of the third processing unit and a utilization of the third processing unit.

In another embodiment, the first ANN is a first convolutional neural network (CNN) including convolutional layers having small and large kernels, activation layers, pooling layers, and fully-connected layers; the second ANN is a second CNN including convolutional layers having small and large kernels, activation layers, pooling layers, and fully connected layers, the second CNN convolutional layers having fewer small kernels and more large kernels than the first CNN; the third ANN is a third CNN including convolutional layers having small and large kernels, activation layers, pooling layers, and fully connected layers, the third CNN convolutional layers having fewer small kernels and more large kernels than the first CNN or the second CNN; the small kernel is convolution filter having a size of 3×3 or smaller; and the large kernel is convolution filter having a size of 5×5 or larger.

In another embodiment, during operation of the heterogenous system, the first ANN output layer generates a first set of normalized probability values, the second ANN output layer generates a second set of normalized probability values, and the third ANN output layer generates a third set of normalized probability values; and the first processing unit ensemble averages the first, second and third sets of normalized probability values, using respective first, second and third weights, into a final set of normalized probability values.

In another embodiment, the first, second and third weights are 1.

In another embodiment, the first weight is based on a number of floating point operations per second (FLOPS) for the first processor, the second weight is based on a number of FLOPS for the second processor, and the third weight is based on a number of FLOPS for the third processor.

In another embodiment, during operation of the heterogenous system, the first ANN output layer generates a first set of values, the second ANN output layer generates a second set of values, and the third ANN output layer generates a third set of values; and the first processing unit concatenates the first, second and third sets of values into a set of probability values, and converts the set of probability values into a set of normalized probability values.

In another embodiment, the first ANN hidden layers include a first block and a second block, the first block includes one or more hidden layers, the second block includes one or more hidden layers, and the first block is configured to output a first intermediate volume; the second ANN hidden layers include a first block and a second block, the first block includes one or more hidden layers, the second block includes one or more hidden layers, and the first block is configured to output a second intermediate volume; the third ANN hidden layers include a first block and a second block, the first block includes one or more hidden layers, the second block includes one or more hidden layers, and the first block is configured to output a third intermediate volume; and during operation of the heterogenous system, the first processing unit concatenates the first, second and third intermediate volumes into a single intermediate volume, and provide at least a first portion of the single intermediate volume to the second block of the first ANN, a second portion of the single intermediate volume to the second block of the second ANN, and a third portion of the single intermediate volume to the second block of the third ANN.

In another embodiment, during operation of the heterogenous system, the first processing unit executes a facial recognition application, the input volume is an image of a face, and the first, second and third ANNs extract facial features from the image.

While implementations of the disclosure are susceptible to embodiment in many different forms, there is shown in the drawings and will herein be described in detail specific embodiments, with the understanding that the present disclosure is to be considered as an example of the principles of the disclosure and not intended to limit the disclosure to the specific embodiments shown and described. In the description above, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," "for example," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus, device, system, etc. may be used interchangeably in this text.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A heterogenous system, comprising:
a memory configured to store an input volume having an input width, an input height, an input depth and a plurality of input values, the input depth being determined by a number of input channels; and
a plurality of processing units, coupled to the memory, including:
a first processing unit, including at least one first processor, configured to execute a first artificial neural network (ANN) including an input layer configured to receive at least a first portion of the input volume, one or more first ANN hidden layers optimized for the first processor, and an output layer; and
a second processing unit, including at least one second processor that is different than the first processor, configured to execute a second ANN including an input layer configured to receive at least a second portion of the input volume, one or more second ANN hidden layers optimized for the second processor, and an output layer, the second ANN hidden layers being different than the first ANN hidden layers,
where the first ANN output layer generates a first set of normalized probability values or a first set of values, the second ANN output layer generates a second set of normalized probability values or a second set of values, and where the first processing unit is configured to ensemble average the first and second sets of normalized probability values, using respective first and second weights, into a final set of normalized probability values or the first processing unit is configured to concatenate the first and second sets of values into a set of probability values and convert the set of probability values into a set of normalized probability values; and
a third processing unit, having at least one third processor that is different than the first processor and the second processor, configured to execute a third ANN including an input layer to receive at least a third portion of the input volume, one or more third ANN hidden layers optimized for the third processor, and an output layer, the third ANN hidden layers being different than the first ANN hidden layers and the second ANN hidden layers,
where the first ANN is a first convolutional neural network (CNN) that includes convolutional layers having small and large kernels, activation layers, pooling layers, and fully-connected layers;
the second ANN is a second CNN that includes convolutional layers having small and large kernels, activation layers, pooling layers, and fully connected layers, the second CNN convolutional layers having fewer small kernels and more large kernels than the first CNN; and
the third ANN is a third CNN that includes convolutional layers having small and large kernels, activation layers, pooling layers, and fully connected layers, the third CNN convolutional layers having fewer small kernels and more large kernels than the first CNN or the second CNN.

2. The heterogenous system of claim 1, where:
the first processing unit is a central processing unit (CPU), the second processing unit is a graphics processing unit (GPU), and the third processing unit is a neural processing unit (NPU).

3. The heterogenous system of claim 1, where:
the small kernel is convolution filter having a size of 3×3 or smaller; and
the large kernel is convolution filter having a size of 5×5 or larger.

4. The heterogenous system of claim 1, where the first processing unit is configured to execute a facial recognition application, the input volume is an image of a face, and the first, second and third ANNs extract facial features from the image.

5. A heterogenous system, comprising:
a memory configured to store an input volume having an input width, an input height, an input depth and a plurality of input values, the input depth being determined by a number of input channels; and
a plurality of processing units, coupled to the memory, including:
a first processing unit, including at least one first processor, configured to execute a first artificial neural network (ANN) including an input layer configured to receive at least a first portion of the input volume, one or more first ANN hidden layers optimized for the first processor, and an output layer; and
a second processing unit, including at least one second processor that is different than the first processor, configured to execute a second ANN including an input layer configured to receive at least a second portion of the input volume, one or more second ANN hidden layers optimized for the second processor, and an output layer, the second ANN hidden layers being different than the first ANN hidden layers,
the first ANN output layer generates a first set of normalized probability values or a first set of values, the second ANN output layer generates a second set of normalized probability values or a second set of values, and where the first processing unit is configured to ensemble average the first and second sets of normalized probability values, using respective first and second weights, into a final set of normalized probability values or the first processing unit is configured to concatenate the first and second sets of values into a set of probability values and convert the set of probability values into a set of normalized probability values;
a third processing unit, having at least one third processor that is different than the first processor and the second processor, configured to execute a third ANN including an input layer to receive at least a third portion of the input volume, one or more third ANN hidden layers optimized for the third processor, and an output layer, the third ANN hidden layers being different than the first ANN hidden layers and the second ANN hidden layers, where:
the first ANN output layer generates the first set of normalized probability values, the second ANN output layer generates the second set of normalized probability values, and the third ANN output layer generates a third set of normalized probability values; and
the first processing unit is configured to ensemble average the first, second and third sets of normalized probability values, using respective first, second and third weights, into a final set of normalized probability values.

6. The heterogenous system of claim 5, where the first, second and third weights are 1.

7. The heterogenous system of claim 5, where the first weight is based on a number of floating point operations per second (FLOPS) for the first processor, the second weight is based on a number of FLOPS for the second processor, and the third weight is based on a number of FLOPS for the third processor.

8. A heterogenous system, comprising:
a memory configured to store an input volume having an input width, an input height, an input depth and a plurality of input values, the input depth being determined by a number of input channels; and
a plurality of processing units, coupled to the memory, including:
a first processing unit, including at least one first processor, configured to execute a first artificial neural network (ANN) including an input layer configured to receive at least a first portion of the input volume, one or more first ANN hidden layers optimized for the first processor, and an output layer; and
a second processing unit, including at least one second processor that is different than the first processor, configured to execute a second ANN including an input layer configured to receive at least a second portion of the input volume, one or more second ANN hidden layers optimized for the second processor, and an output layer, the second ANN hidden layers being different than the first ANN hidden layers,
the first ANN output layer generates a first set of normalized probability values or a first set of values, the second ANN output layer generates a second set of normalized probability values or a second set of values, and where the first processing unit is configured to ensemble average the first and second sets of normalized probability values, using respective first and second weights, into a final set of normalized probability values or the first processing unit is configured to concatenate the first and second sets of values into a set of probability values and convert the set of probability values into a set of normalized probability values;
a third processing unit, having at least one third processor that is different than the first processor and the second processor, configured to execute a third ANN including an input layer to receive at least a third portion of the input volume, one or more third ANN hidden layers optimized for the third processor, and an output layer, the third ANN hidden layers being different than the first ANN hidden layers and the second ANN hidden layers, where:
the first ANN output layer generates the first set of values, the second ANN output layer generates the second set of values, and the third ANN output layer generates a third set of values; and
the first processing unit is configured to concatenate the first, second and third sets of values into the set of probability values, and convert the set of probability values into a set of normalized probability values.

9. The heterogenous system of claim 8, where:
the first ANN hidden layers include a first block and a second block, the first block includes one or more hidden layers, the second block includes one or more hidden layers, and the first block is configured to output a first intermediate volume;
the second ANN hidden layers include a first block and a second block, the first block includes one or more hidden layers, the second block includes one or more hidden layers, and the first block is configured to output a second intermediate volume;

the third ANN hidden layers include a first block and a second block, the first block includes one or more hidden layers, the second block includes one or more hidden layers, and the first block is configured to output a third intermediate volume; and the first processing unit is configured to concatenate the first, second and third intermediate volumes into a single intermediate volume, and provide at least a first portion of the single intermediate volume to the second block of the first ANN, a second portion of the single intermediate volume to the second block of the second ANN, and a third portion of the single intermediate volume to the second block of the third ANN.

10. A method for generating an artificial neural network (ANN) for a heterogenous system, comprising:

generating a first ANN for a first processing unit having at least one first processor, the first ANN including an input layer configured to receive at least a first portion of an input volume, one or more first ANN hidden layers optimized for the first processor, and an output layer, where generating the first ANN is based on an accuracy of the first ANN, a latency of the first processing unit and a utilization of the first processing unit; and generating a second ANN for a second processing unit having at least one second processor that is different than the first processor, the second ANN including an input layer configured to receive at least a second portion of the input volume, one or more second ANN hidden layers optimized for the second processor, and an output layer, the second ANN hidden layers being different than the first ANN hidden layers, where generating the second ANN is based on an accuracy of the second ANN, a latency of the second processing unit and a utilization of the second processing unit, where, during operation of the heterogenous system, the first ANN output layer generates a first set of normalized probability values or a first set of values, the second ANN output layer generates a second set of normalized probability values or a second set of values, and where the first processing unit ensemble averages the first and second sets of normalized probability values, using respective first and second weights, into a final set of normalized probability values or the first processing unit concatenates the first and second sets of values into a set of probability values and converts the set of probability values into a set of normalized probability values, generating a third ANN for a third processing unit having at least one third processor that is different than the first processor and the second processor, the third ANN including an input layer to receive at least a third portion of the input volume, one or more third ANN hidden layers optimized for the third processor, and an output layer, the third ANN hidden layers being different than the first ANN hidden layers and the second ANN hidden layers, where generating the third ANN is based on an accuracy of the third ANN, a latency of the third processing unit and a utilization of the third processing unit, where the first ANN is a first convolutional neural network (CNN) including convolutional layers having small and large kernels, activation layers, pooling layers, and fully-connected layers;

the second ANN is a second CNN including convolutional layers having small and large kernels, activation layers, pooling layers, and fully connected layers, the second CNN convolutional layers having fewer small kernels and more large kernels than the first CNN;

the third ANN is a third CNN including convolutional layers having small and large kernels, activation layers, pooling layers, and fully connected layers, the third CNN convolutional layers having fewer small kernels and more large kernels than the first CNN or the second CNN;

the small kernel is convolution filter having a size of 3×3 or smaller; and the large kernel is convolution filter having a size of 5×5 or larger.

11. The method of claim 10, where, during operation of the heterogenous system:

the third ANN output layer generates a third set of normalized probability values; and the first processing unit ensemble averages the first, second and third sets of normalized probability values, using respective first, second and third weights, into the final set of normalized probability values.

12. The method of claim 11, where the first, second and third weights are 1.

13. The method of claim 11, where the first weight is based on a number of floating point operations per second (FLOPS) for the first processor, the second weight is based on a number of FLOPS for the second processor, and the third weight is based on a number of FLOPS for the third processor.

14. The method of claim 10, where, during operation of the heterogenous system:

the third ANN output layer generates a third set of values; and the first processing unit concatenates the first, second and third sets of values into the set of probability values, and converts the set of probability values into the set of normalized probability values.

15. The method of claim 14, where:

the first ANN hidden layers include a first block and a second block, the first block includes one or more hidden layers, the second block includes one or more hidden layers, and the first block is configured to output a first intermediate volume;

the second ANN hidden layers include a first block and a second block, the first block includes one or more hidden layers, the second block includes one or more hidden layers, and the first block is configured to output a second intermediate volume;

the third ANN hidden layers include a first block and a second block, the first block includes one or more hidden layers, the second block includes one or more hidden layers, and the first block is configured to output a third intermediate volume; and during operation of the heterogenous system, the first processing unit concatenates the first, second and third intermediate volumes into a single intermediate volume, and provide at least a first portion of the single intermediate volume to the second block of the first ANN, a second portion of the single intermediate volume to the second block of the second ANN, and a third portion of the single intermediate volume to the second block of the third ANN.

16. The method of claim 10, where, during operation of the heterogenous system, the first processing unit executes a facial recognition application, the input volume is an image of a face, and the first, second and third ANNs extract facial features from the image.

* * * * *